US007620307B2

(12) United States Patent  (10) Patent No.: US 7,620,307 B2
Katayama  (45) Date of Patent: Nov. 17, 2009

(54) IMAGE PICKUP APPARATUS AND METHOD FOR CONTROLLING THE SAME

(75) Inventor: Toshio Katayama, Osaka (JP)

(73) Assignee: Sony Corporation (JP)

( * ) Notice: Subject to any disclaimer, the term of this patent is extended or adjusted under 35 U.S.C. 154(b) by 417 days.

(21) Appl. No.: 11/511,817

(22) Filed: Aug. 29, 2006

(65) Prior Publication Data

US 2007/0092239 A1    Apr. 26, 2007

(30) Foreign Application Priority Data

Aug. 31, 2005    (JP)    ............................ P2005-250807

(51) Int. Cl.
*G03B 13/32*    (2006.01)
(52) U.S. Cl. ........................................ 396/90; 348/357
(58) Field of Classification Search .................... 396/90; 348/357; 359/697, 824
See application file for complete search history.

(56) References Cited

U.S. PATENT DOCUMENTS 5,495,309 A *  2/1996  Shiina et al. ................... 396/86
6,029,010 A *  2/2000  Miyanari ....................... 396/90
7,130,536 B2 * 10/2006  Ito .............................. 396/125
2005/0220449 A1 * 10/2005  Hirai ............................ 396/79
2007/0133970 A1 *  6/2007  Honjo et al. ................... 396/97

FOREIGN PATENT DOCUMENTS

JP    2001-087989    4/2001

* cited by examiner

*Primary Examiner*—Melissa J. Koval
*Assistant Examiner*—Autumn Parker
(74) *Attorney, Agent, or Firm*—Lerner, David, Littenberg, Krumholz & Mentlik, LLP

(57) ABSTRACT

An image pickup apparatus includes a relative phase detecting unit operable to detect an amount of change in a relative phase associated with movement of a movable portion; an origin point position detecting unit operable to detect that the position of a reference part passes through an origin point; a relative position deriving unit operable to derive information on a relative position of the movable portion; a relative detection position retaining unit operable to retain a relative detection position of the movable portion based on the information on the relative position obtained at the time of the detection by the origin point position detecting unit; a calculating unit operable to calculate an absolute detection phase based on the relative detection position of the movable portion and to generate a drive signal based on the absolute detection phase; and a driving unit operable to move the movable portion to the reset position based on the drive signal.

8 Claims, 8 Drawing Sheets

IMAGE PICKUP APPARATUS AND METHOD FOR CONTROLLING THE SAME

CROSS-REFERENCE TO RELATED APPLICATIONS

The present application claims priority from Japanese Patent Application No. JP 2005-250807 filed on Aug. 31, 2005, the disclosure of which is hereby incorporated by reference herein.

BACKGROUND OF THE INVENTION

1. Field of the Invention

The present invention relates to image pickup apparatuses and methods for controlling the image pickup apparatuses. In particular, the present invention relates to an image pickup apparatus and a method for controlling the image pickup apparatus for returning a movable portion to a reset position.

2. Description of the Related Art

There are several techniques for leading movable portions to their reset positions, in which movable portions are returned to the reset positions by performing returning operations. The reset positions are specified by origin points (reference points for positioning) which are automatically detected.

Examples of such techniques for detecting an origin point include a "grouping" technique which uses a mechanical end and a technique which uses a reset sensor for origin point detection such as an optical sensor, a magnetic sensor, and a limit switch.

The "grouping" technique is advantageous in miniaturization and cost reduction, since it basically uses only a driving mechanism and a detection system. However, the technique cannot always be employed due to mechanical restrictions caused by "adhesion". On the other hand, in order to employ a reset sensor, a space is necessary for installing the reset sensor. However, the maximum amount of movement necessary for origin point detection can be reduced by selecting an install position for the sensor, as compared to the "grouping" technique. Therefore, reset sensors are advantageous in terms of speed of leading movable portions to their origin points.

In consumer video lens devices or the like, such reset sensors for returning lenses to their reset positions are used with a view to miniaturization. At the same time, in such consumer vireo lens devices, it is necessary that lenses be returned to their reset positions with high precision and speed. When a speed-reduction mechanism such as a feed screw for preventing a movable portion from being back-driven is used for a driving system of a lens device, a starting position is set in advance near an origin point detection element i.e., a reset sensor so that a returning operation can be performed with high speed. However, when a direct drive mechanism such as a DC linear motor is used, the position of the movable portion is moved by inertia or external force without a locking mechanism installed separately, which causes difficulty in achieving an advantage of high speed returning operation.

In addition, when a non-contact optical sensor or magnetic sensor is used as the reset sensor, a detection error caused by a drive condition of the lens under which the origin point is detected prevents an increase in the speed of returning operation. Such a detection error includes mechanical hysteresis and play between a drive system and a detection system, and response characteristics/hysteresis of the detection system.

There are several techniques for handling such error factors, in which driving velocities and directions are controlled. For example, in a known technique, the direction in which a movable portion passes over a reset sensor is limited to a predetermined direction so that mechanical play and hysteresis in a drive system and hysteresis in a detection system can be handled. In addition, in this technique, for handling response characteristics of the detection system, the velocity at which the movable portion passes over the reset sensor is limited below a predetermined velocity (see, for example, Japanese Unexamined Patent Application Publication No. 2001-87989).

However, the technique for controlling a driving velocity and direction in origin point detection described above may cause a situation where the detection needs to be repeated in a specific direction or where low-speed driving cannot be avoided. This prevents the benefits of a direct drive mechanism from being realized. In addition, increasing precision in installing a reset sensor or enhancing the response characteristics of a detection system disadvantageously results in increased manufacturing cost.

The present invention has been made in view of the above circumstances. Accordingly, there is a need for an image pickup apparatus and a method for controlling the image pickup apparatus which permits detection of an origin point and a returning operation with high seed and precision.

SUMMARY OF THE INVENTION

Thus, according to an aspect of the present invention, there is provided an image pickup apparatus which is configured to return a movable portion to a reset position. The apparatus includes relative phase detecting means for detecting an amount of change in a relative phase associated with movement of the movable portion; origin point position detecting means for detecting that the position of a reference part corresponding to an origin point of the movable portion passes through the origin point; relative position deriving means for deriving information on a relative position of the movable portion based on the amount of change in the relative phase; relative detection position retaining means for retaining a relative detection position of the movable portion based on the information on the relative position obtained at the time of the detection by the origin point position detecting means; calculating means for calculating an absolute detection phase based on the relative detection position of the movable portion and for generating a drive signal based on the absolute detection phase; and driving means for moving the movable portion to the reset position based on the drive signal.

In this image pickup apparatus according to an embodiment of the present invention, a relative detection position is retained by the relative detection position retaining means based on information on a relative position obtained at the time of detection by the origin point detecting means, an absolute detection phase is calculated by the calculating means based on the relative detection position, and a drive signal is generated by the calculating means based on the absolute detection phase. In addition, the movable portion is moved by the driving means to the reset position based on the drive signal.

According to an embodiment of the present invention, a relative detection position of a movable portion is retained based on information on a relative position, and an absolute detection phase is calculated based on the relative detection position. This arrangement brings about a distinct phase difference between the relative detection phase and a predetermined absolute origin point phase, which allows the movable portion to be returned to the reset position with ease and precision by calculating a difference between the two phases.

DETAILED DESCRIPTION

Figure 1:
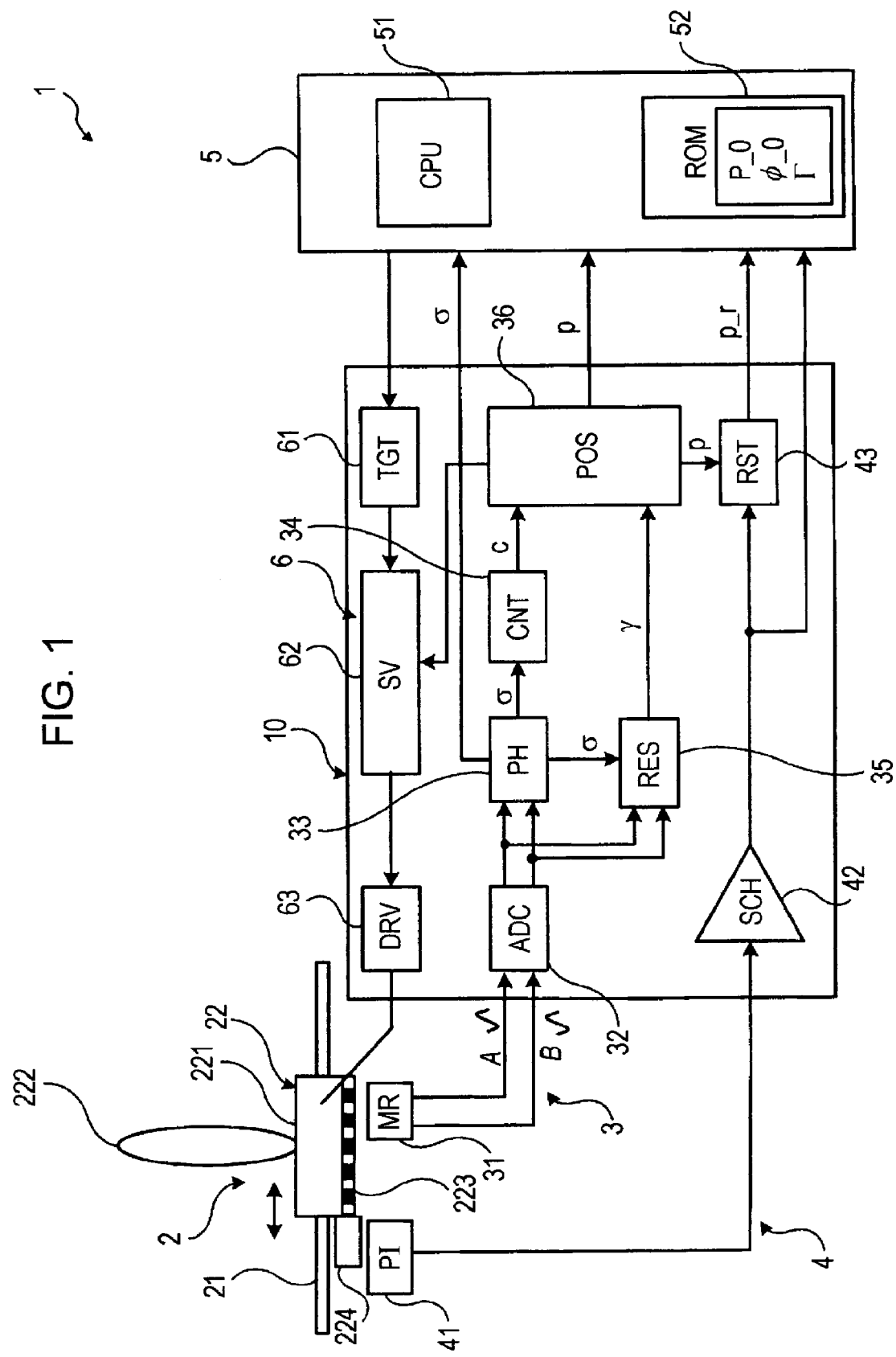
FIG. 1 is a block diagram illustrating an image pickup apparatus according to an embodiment of the present invention.

In the following, a preferred embodiment of the present invention will be described in detail with reference to the accompanying drawings. FIG. 1 is a block diagram illustrating an image pickup apparatus according to an embodiment of the present invention. For simplicity of description, the lower part of the figure is referred to as "bottom", the left part as "left", and the right part as "right". In addition, the left direction in the figure is referred to as "forward direction", and the right direction in the figure is referred to as "backward direction".

As shown in FIG. 1, an image pickup apparatus 1 has a position detection system 3 including a direct drive system 2, a magnetoresistive (MR) element 31 for outputting a two-phase analog signal, an analog/digital (AD) conversion circuit (ADC) 32, a phase detection circuit (PH) 33, a phase counter circuit (CNT) 34, a phase resolution circuit (RES) 35, and a relative position circuit (POS) 36. The image pickup apparatus 1 also has an origin point detection system 4 including a photo-interrupter (PI) 41, a Schmitt trigger buffer circuit 42, and an origin point latch circuit (RST) 43, and a lens drive system 6 including a microcomputer 5 with a CPU 51 and a ROM 52, a relative target position circuit (TGT) 61, a servo commander (SV) 62, and driver circuit (DRV) 63.

A driver 10 includes the AD conversion circuit 32, the phase detection circuit (PH) 33, the phase counter circuit (CNT) 34, the phase resolution circuit (RES) 35, the relative position circuit (POS) 36, the Schmitt trigger buffer circuit 42, the origin point latch circuit (RST) 43, the relative target position circuit (TGT) 61, the servo commander (SV) 62, and the driver circuit (DRV) 63. This driver 10 primarily constitutes a relative position deriving unit.

The direct drive system 2 includes a main shaft (a fixed portion) 21 and a movable portion 22 having a linear motor (actuator) 221 linearly movable (slidable) along the main shaft 21, and a lens 222 disposed on the linear motor 221 for converging light from an object to be imaged. The movable portion also has magnets (scale) 223 polarized under (a bottom surface of) the linear motor 221 at predetermined intervals in a moving direction (right and left directions), and a position detection fin 224 serving as a reference part applied onto a left side end of the linear motor 221.

The linear motor 221 is electrically connected to the driver circuit 63. The position detection fin 224 serves to detect a position of the movable portion 22. In the following, the position detection system 3 will be described.

Figure 2:
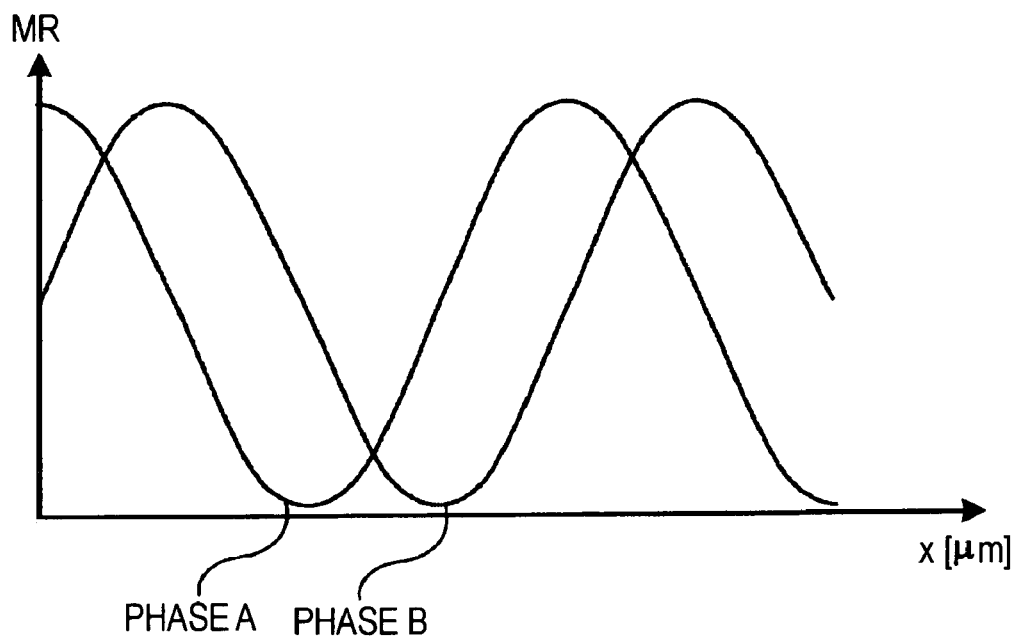
FIG. 2 illustrates a waveform of an output of an MR element.

Referring to FIG. 2, waveforms of an output of the MR element (relative phase detecting means) 31. The MR element 31 detects a magnitude of a magnetic field generated by the magnets 223 in accordance with movement of the movable portion 22. In accordance with the detected magnitude, the MR element 31 outputs sine waves whose phases are shifted with respect to each other by 90 degrees (phase A, phase B).

The A/D conversion circuit 32 converts the sine waves of the phase A and phase B from the MR element 31 into a digital sine wave signal having the phase A and a digital sine wave signal having the phase B, respectively. These converted signals are hereinafter referred to as A/B phase sine wave signals.

Figure 3:
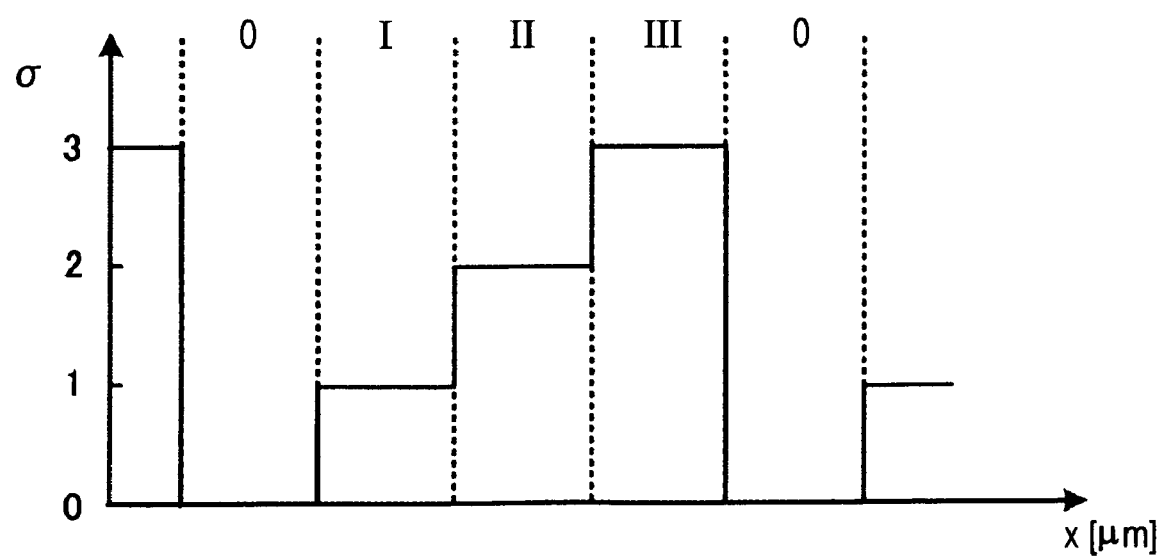
FIG. 3 illustrates a waveform of an output of a phase detection circuit.

FIG. 3 illustrates a waveform of an output from the phase detection circuit 33. The phase detection circuit 33 creates phase regions by dividing a unit cycle into four in accordance with a relationship between the phases of the A/B sine wave signals. Then, the phase detection circuit 33 generates phase information ($\sigma$) ($\sigma$=0, 1, 2, 3), as shown in FIG. 3, on the basis of a state of each phase in the individual phase region. Any dividing scheme may be employed, but it is desirable to divide the cycle so that either one of the phase A or phase B exhibits a monotonic increase or a monotonic decrease. With this arrangement, the value of the phase information 0 is "0", the phase information 1, "1", the phase information 2, "2", and the phase information 3, "3". Thus, the A/B sine wave signals are divided (patterned) into four phases in accordance with a relationship between the phases A and B.

Figure 4:
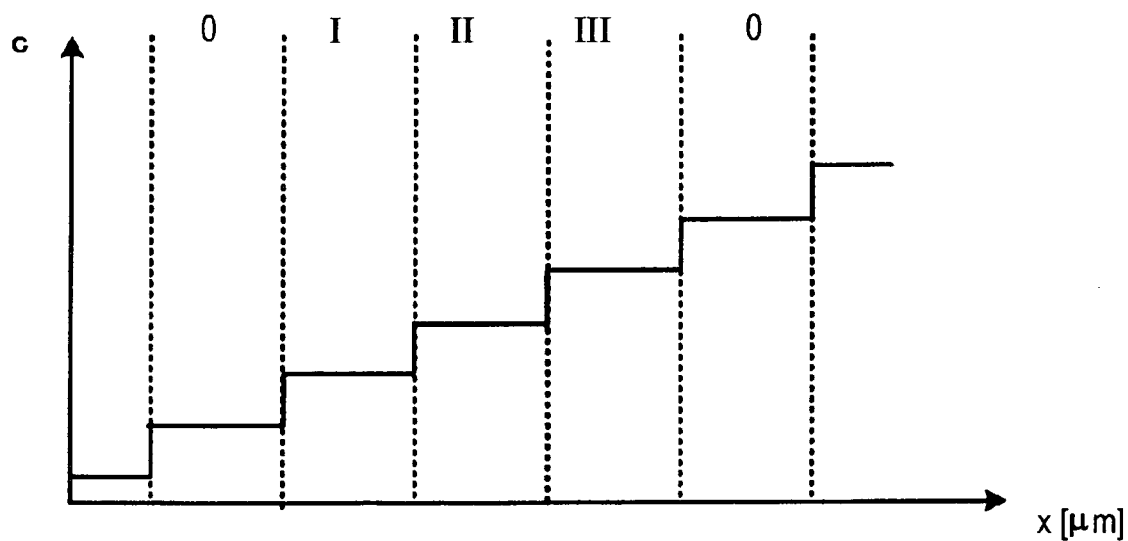
FIG. 4 illustrates a waveform of an output of a phase counter circuit.

FIG. 4 illustrates a waveform of an output of the phase counter circuit 34. In the phase counter circuit 34, the initial value is set to 0, and a counting operation is performed on the basis of an increase or decrease in the phase information value ($\sigma$) so that a counter value c is output. The phase counter circuit 34 counts up when the phase information values are input in the order 0, 1, 2, 3, as shown in FIG. 3, and counts down when the phase information values are input in the order of 3, 2, 1, 0.

Figure 5:
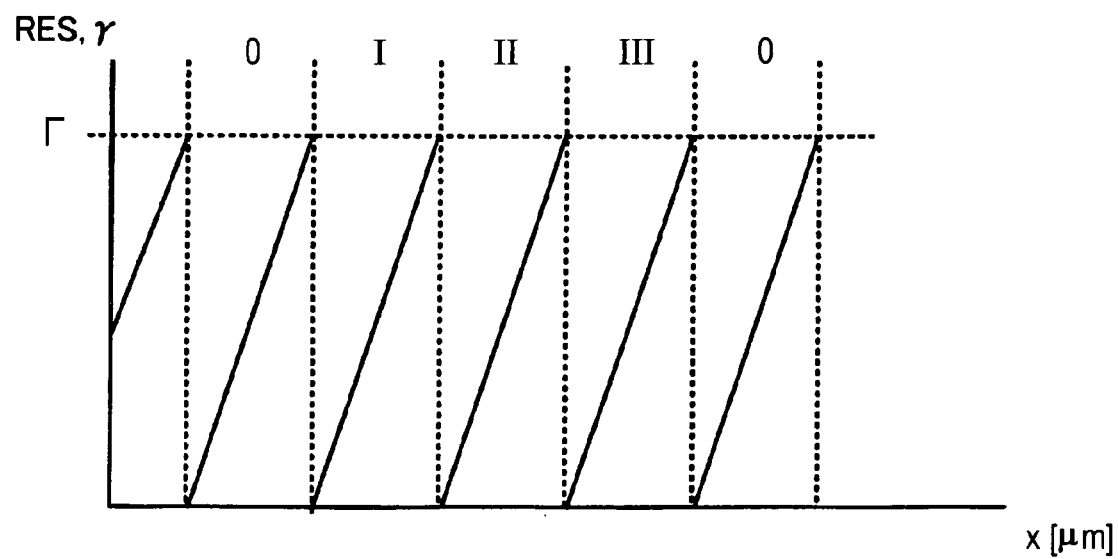
FIG. 5 illustrates a waveform of an output of a phase resolution circuit.

FIG. 5 illustrates a waveform of an output of the phase resolution circuit 35. The phase resolution circuit 35 receives phase information ($\sigma$) and the A/B phase sine wave signal, so as to determine whether a linear portion of a waveform of the A/B phase sine waves represents the phase A or the phase B. Then, the phase resolution circuit 35 divides the linear portion of the phase by $\Gamma$, the number by which the phases are divided (phase resolution number), so as to generate phase resolution position information $\gamma$ ($0 \leq \gamma < \Gamma$) which is detailed information on a position in each of the phases A and B. The phase resolution number $\Gamma$ depends on the resolution of the A/D conversion circuit 32 and can be, for example $2^n$ ($1 \leq n$).

Figure 6:
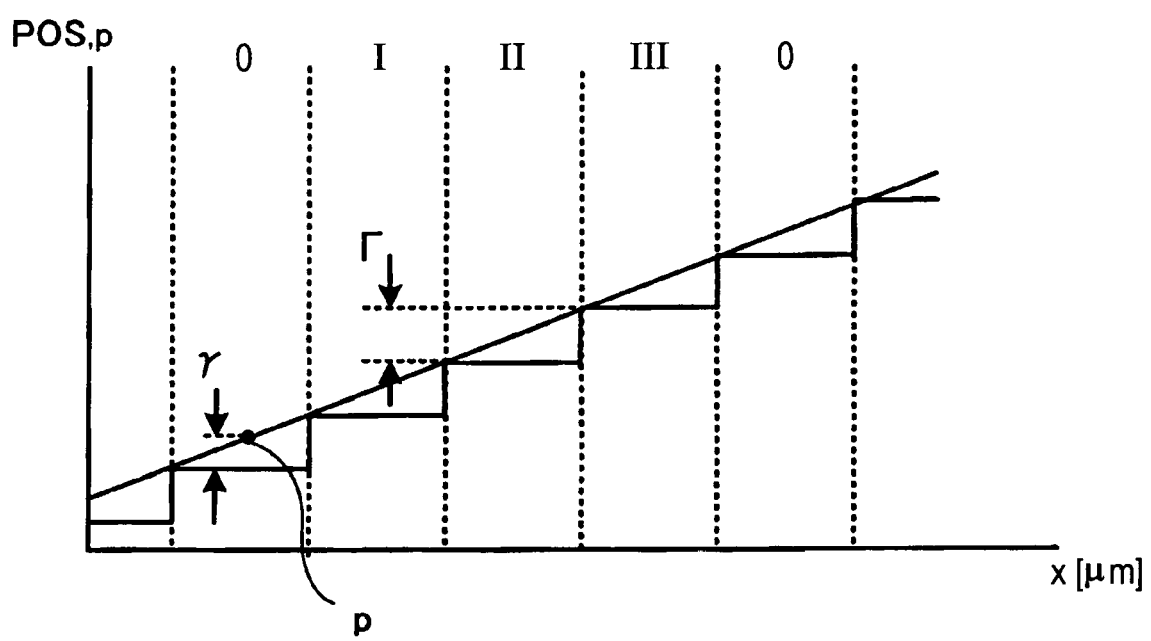
FIG. 6 illustrates a waveform of an output of a relative position circuit.

FIG. 6 illustrates a waveform of an output of the relative position circuit 36. The relative position circuit 36 generates a relative position p on the basis of the phase counter value c, the phase resolution position information $\gamma$, and the phase resolution number $\Gamma$. The relative position circuit 36 then outputs the generated relative position p to the origin point latch circuit 43 and the microcomputer 5. The relative position p can be expressed by Formula (1) shown below.

$$p = \Gamma \cdot c + \gamma \tag{1}$$

This relative position p is a relative position obtained at the time of position detection performed by the MR element 31.

Figure 7:
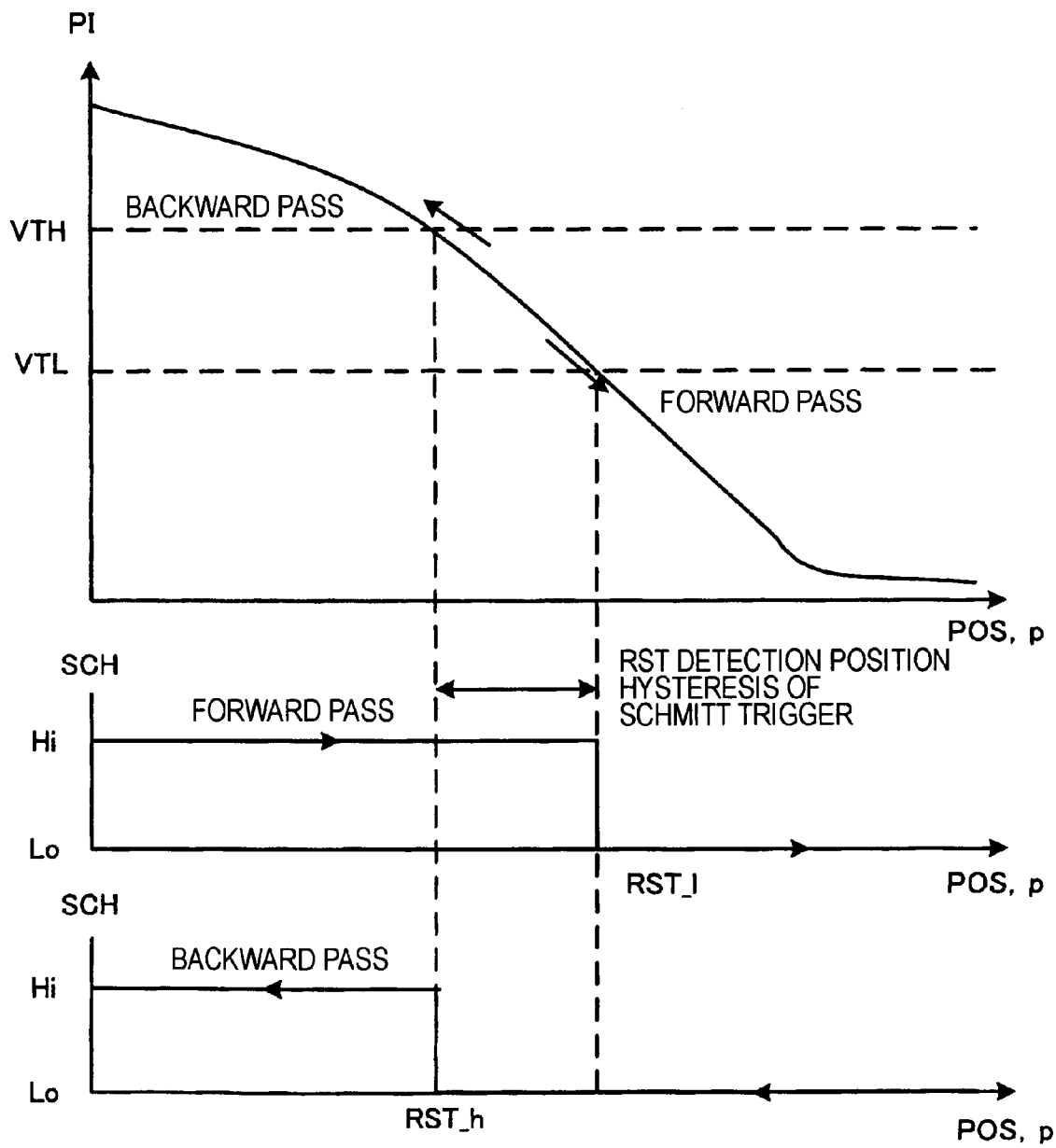
FIG. 7 illustrates a waveform of an output of a photo-interrupter.

In the following, the origin point position detection system 4 will be described. The photo-interrupter (reset sensor) 41 outputs an analog signal corresponding to a shaded state produced by the position detection fin 224. FIG. 7 illustrates a waveform of an output of the photo-interrupter 41.

The Schmitt trigger buffer circuit 42 converts the analog signal output from the photo-interrupter 41 into digital output (Hi, Lo) on the basis of two threshold values (VTH, VTL) due to a hysteresis characteristic. When the movable portion passes over the photo-interrupter 41 in the forward direction, the threshold value of the output of the Schmitt trigger buffer circuit 42 is VTL. When the movable portion passes over the photo-interrupter 41 in the backward direction, the threshold value of the output is VTH.

The photo-interrupter 41 and the Schmitt trigger buffer circuit 42 constitute the main part of an origin point detecting unit for detecting that the reference part corresponding to the origin point of the movable portion 22 passes through the origin point.

Every time a change in the polarity of the output signal from the Schmitt trigger buffer circuit 42 occurs, the origin point latch circuit 43 latches the relative position p obtained at the time when the polarity change occurs, to a register in the origin point latch circuit 43. Then the origin point latch circuit 43 retains the latched relative position as a relative detection position p_r.

The microcomputer 5 acquires via an interface (not shown) the phase information (σ) from the phase detection circuit 33, the relative position p from the relative position circuit 36, the digital output (Hi, Lo) from the Schmitt trigger buffer circuit 42, and the relative detection position p_r from the origin point latch circuit 43. Then, the microcomputer 5 calculates a relative target position corresponding to an intended absolute target position and outputs the calculated relative target position to the relative target position circuit 61.

The CPU 51 executes a program stored in the ROM 52 or the like so as to integrally control various components of the image pickup apparatus 1. The ROM 52 is provided with a storage area for storing the phase resolution number Γ, an absolute origin point position P_0, and an absolute origin point phase φ_0. The ROM 52 is also provided with optical design information (not shown) used for controlling the lens 222. The absolute origin point position P_0 is the position of the origin of a control coordinate system which specifies the optical design information. The absolute origin point P_0 is measured and stored for each lens (movable position) in an optical adjustment process such as flange back adjustment. The absolute origin point phase φ_0 is an absolute phase which is associated with the absolute origin point position P_0 and set in accordance with an absolute phase obtained at the time when the origin point of each lens is detected in an adjustment process.

Now, the lens drive system 6 will be described. The relative target position circuit 61 stores a relative target position designated by the microcomputer 5. The servo commander 62 performs servo control by driving the driver circuit 63 so that a relative position follows the relative target position. Specifically, the servo commander 62 is fed with the relative position p from the relative position circuit 36 and a target value stored in the relative target position circuit 61. Then, on the basis of a deviation between these values, the servo commander 62 generates a drive waveform for output to the driver circuit 63.

The driver circuit 63 is provided with a switching element (not shown) for driving a coil of the linear motor 221 so as to perform switching on the basis of the drive waveform received from the servo commander 62.

A basic operation of the image pickup apparatus 1 will now be described. In the image pickup apparatus 1, the A/B phase sine waveforms are output by the MR element 31 on the basis of a position of the movable portion 22. The A/B phase sine waveforms are converted into the A/B phase sine wave signal by the A/D conversion circuit 32. The phase information (σ) (σ=0, 1, 2, 3) is generated from the A/B phase sine wave signal by the phase detection circuit 33. In the phase counter circuit 34, a counting operation is performed in accordance with an increase or a decrease of the generated phase information (σ) and a resultant phase counter value c is output. In the phase resolution circuit 35, each linear portion of the A/B phase sine wave signal are divided by the resolution number Γ so that the phase resolution position information γ (0≦γ<Γ) is generated. The relative position p is generated by the relative position circuit 36 on the basis of the phase counter value c and the phase resolution position information γ. The relative position p is output to the origin point latch circuit 43 and the microcomputer 5.

In addition, in the image pickup apparatus 1, an analog signal is output from the photo-interrupter 41 generally at the same time that the MR element 31 detects a magnetic field. The analog signal corresponds to a shaded state produced by the position detection fin 224. The analogue signal output from the photo-interrupter 41 is converted by the Schmitt trigger buffer circuit 42 into digital output (Hi, Lo) in accordance with a passing direction of the movable portion 22. Every time a change in the polarity of the output signal from the Schmitt trigger buffer circuit 42 occurs, the relative position p at the time of the polarity change is latched as the relative detection position p_r to the register contained of the origin point latch circuit 43.

Moreover, the microcomputer 5 stores in the relative target position circuit 61 the relative target position calculated on the basis of the absolute target position. The driver circuit 63 is driven by the servo commander 62 so that the relative target position is followed by the relative position p. A switching operation is performed on the basis of a drive waveform generated by the driver circuit 63. Thus, a drive voltage is applied to the linear motor 221 so that the linear motor 221 is driven.

Figure 8:
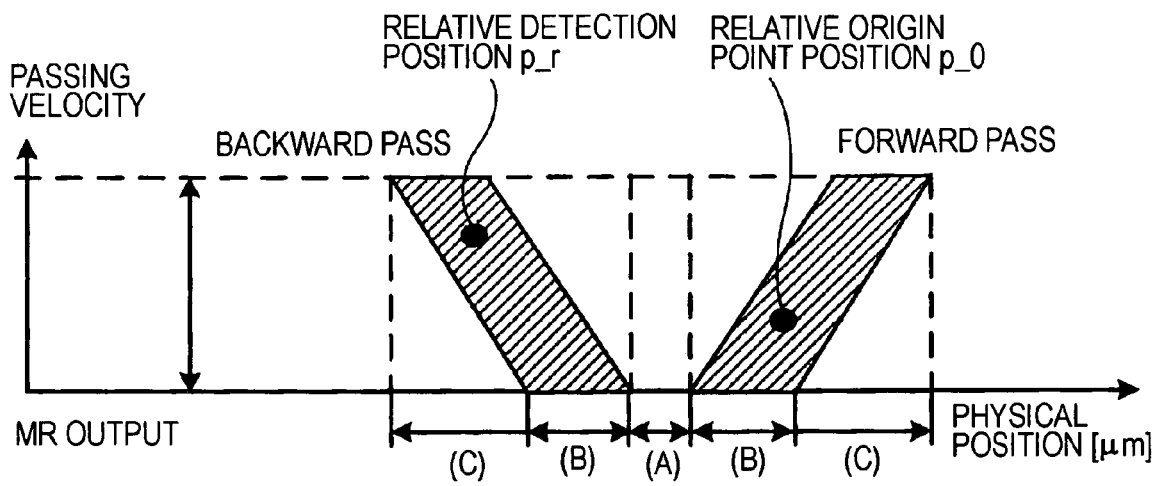
FIG. 8 illustrates a detection error of an image pickup apparatus.
Figure 9:
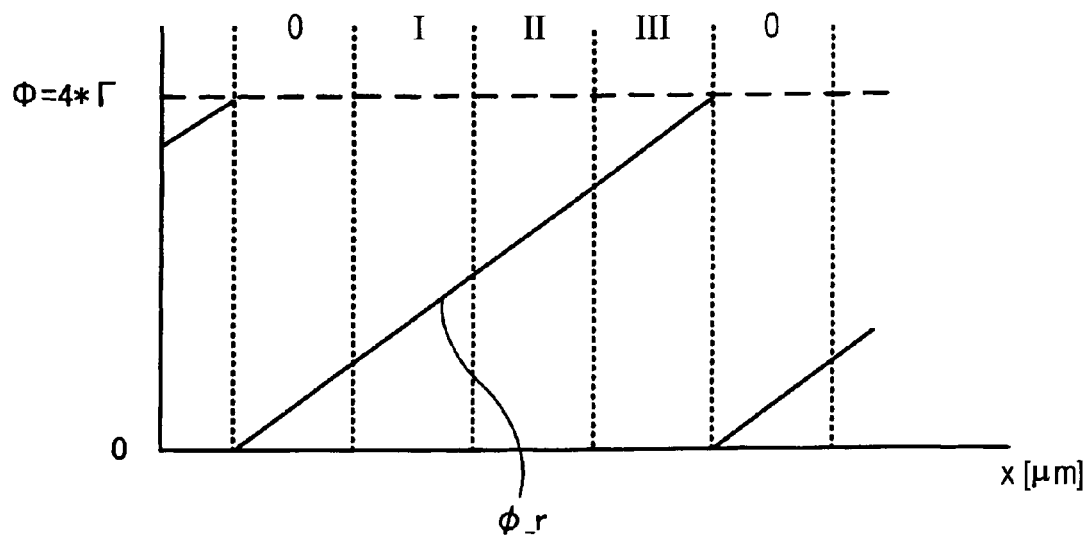
FIG. 9 illustrates an absolute phase generated by a CPU.

Now, an origin point returning operation performed in the image pickup apparatus 1 will be described. Firstly a description is provided of an error which occurs in detection of the origin point. FIG. 8 illustrates a characteristic of such a detection error in an origin point detection process performed by the image pickup apparatus 1.

In the image pickup apparatus 1, an error in a detected position can occur during an origin point returning operation, due to the following factors A to C: A) hysteresis (RST_h, RST_l) of the Schmitt trigger buffer circuit 42 which depends on passing directions of the movable portion 22; B) an error due to a change in a shaded state produced by the position detection fin 224 on the photo-interrupter 41 which is caused by a play (clearance) between the main shaft 21 and the movable portion 22; C) a signal delay due to response characteristics of the photo-interrupter 41.

A to C in FIG. 8 correspond to the factors A to C, respectively, and shaded areas in the figure show the ranges of errors. The error span increases with increasing velocity at which the movable portion 22 passes over the MR element 31. Due to such detection errors, an error occurs between the relative detection position p_r for the origin point returning operation and a true relative origin point position p_0 corresponding to a position used as an origin in the adjustment process described above. Thus, in order to achieve both high speed and high precision in the origin point returning operation, the CPU 51 performs correction on the relative detection position p_r latched when the movable portion 22 passes through the origin point, on the basis of a difference between absolute phases corresponding to the relative detection position p_r and the relative origin point position p_0.

Figure 10:
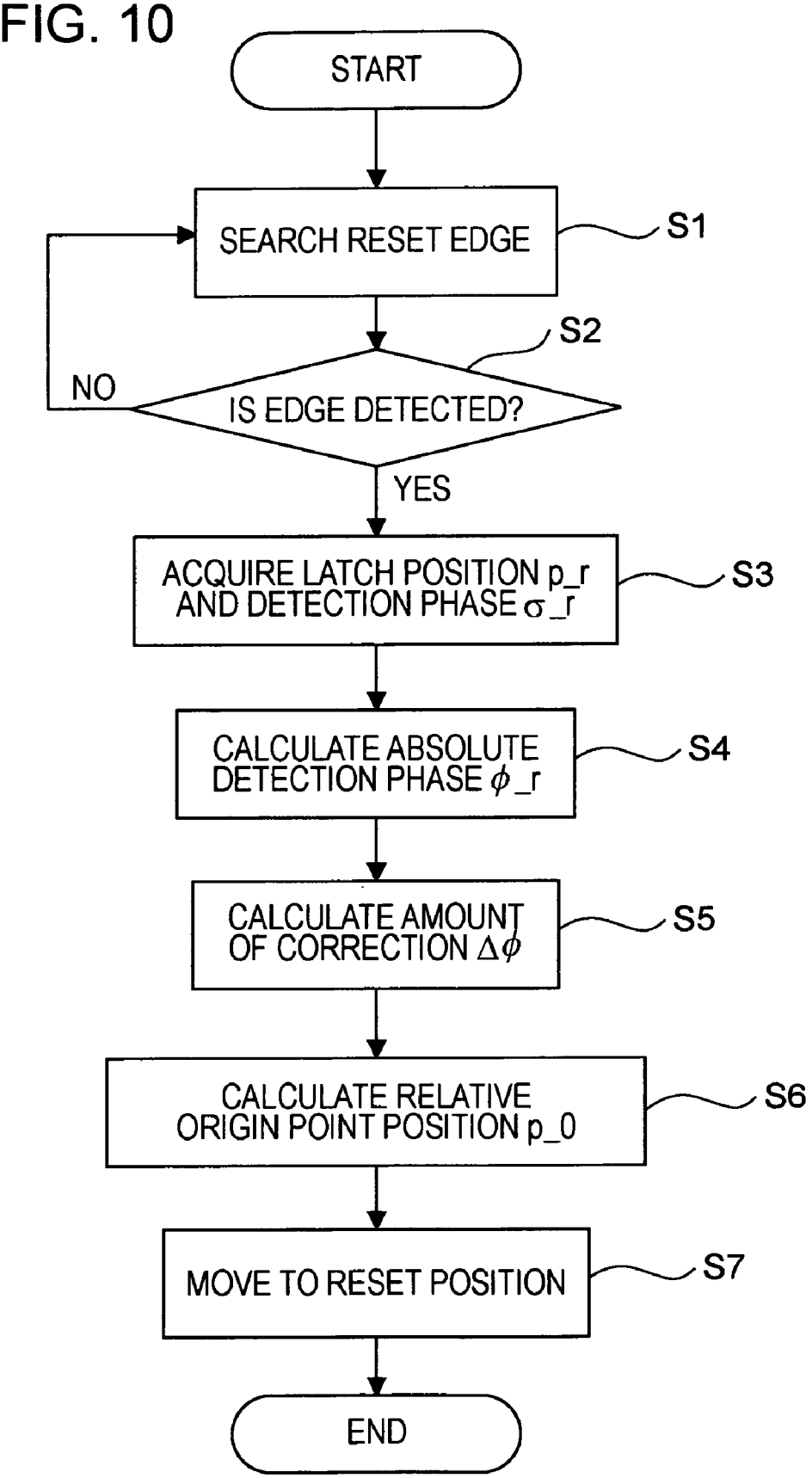
FIG. 10 is a flowchart illustrating a sequence of an origin point returning operation.

In the following, a detailed sequence of an origin point returning operation performed in the image pickup apparatus 1 will be described. A flowchart shown in FIG. 10 illustrates the sequence. An absolute position of the movable portion 22 is not recognizable immediately after the power of the image pickup apparatus 1 is turned on. Thus, driving (search drive) is performed at a predetermined velocity in the direction toward the origin point on the basis of polarity information obtained from the photo-interrupter 41, at STEP S1.

Then, the CPU 51 determines whether or not a reset edge (polarity change) is detected, at STEP S2. If it is determined that a reset edge is not detected in STEP S2, the CPU 51 continues the search drive until it is determined that a reset edge is detected.

If in STEP S2, it is determined that a reset edge is detected, the microcomputer 5 acquires the relative detection position p_r from the origin point latch circuit 43, at STEP S3. Then, at STEP S4, the CPU 51 calculates an absolute detection phase $\phi\_r$ ($0 \leq \phi\_r < 4 \cdot \Gamma$) using Formula (2) shown below using three factors: 1) the phase resolution number $\Gamma$; 2) a phase resolution position $\gamma\_r$ determined by a modulo-$\Gamma$ residue operation for the relative detection position p_r; 3) a detection phase $\sigma\_r$ calculated from the amount of change in a phase counter value of the relative detection position p_r corresponding to a pair of relative position p and phase information $\sigma$.

$$\phi\_r = \Gamma \cdot \sigma\_r + \gamma \quad (2)$$

Figure 11:
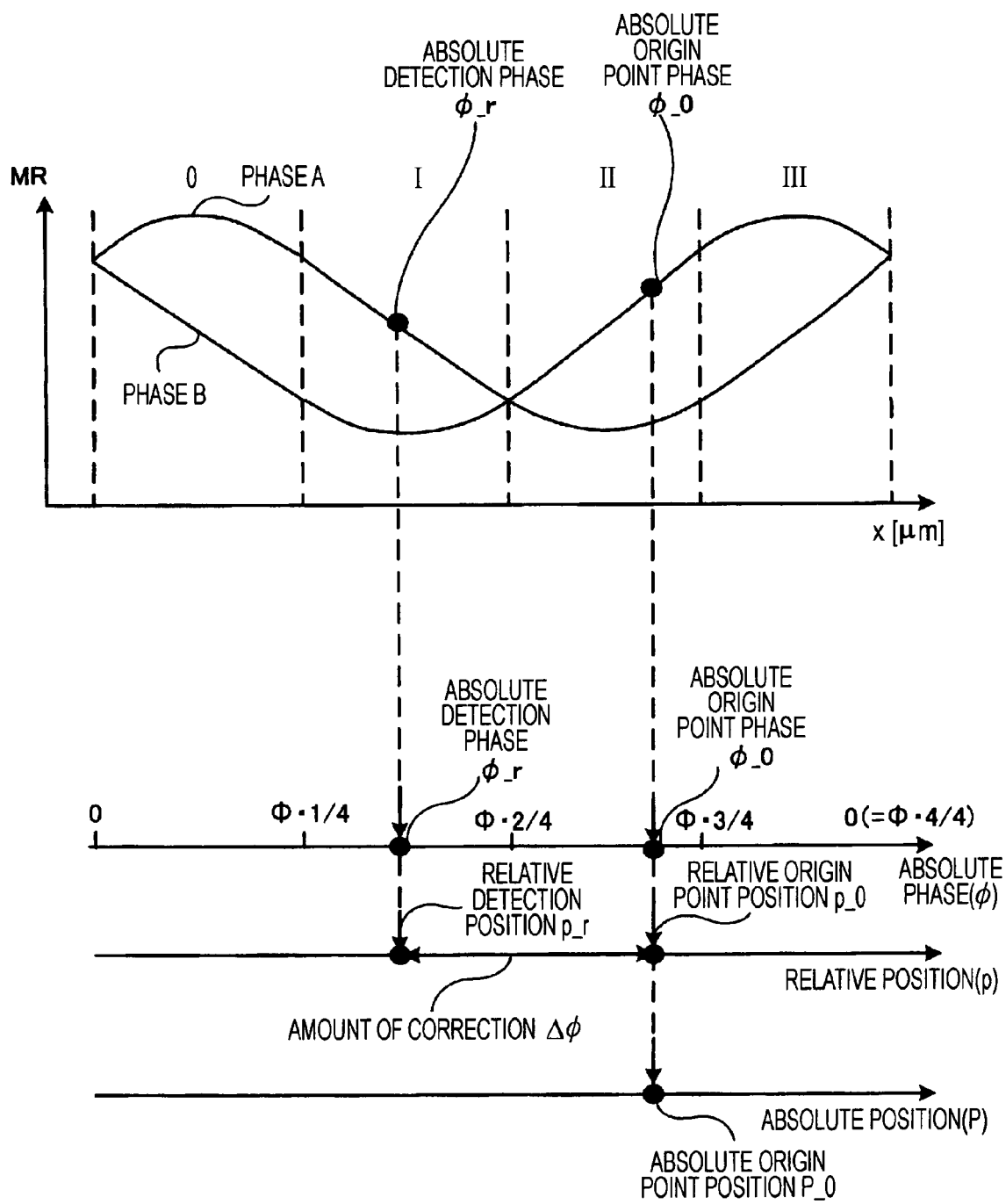
FIG. 11 illustrates a principle of correction of a phase difference in an origin point returning operation.

FIG. 11 illustrates a principle of correction of a phase difference in an origin point returning operation. In the following, description will be provided with reference to both FIG. 10 and FIG. 11.

At STEP S5, the CPU 51 reads the absolute origin point phase $\phi\_0$ stored in the ROM 52 and calculates a difference, as a correction value $\Delta\phi$, between the absolute detection phase $\phi\_r$ and the absolute origin point phase $\phi\_0$, as represented by Formula (3) below.

$$\Delta\phi = \phi\_r - \phi\_0 \quad (3)$$

Note that the correction value $\Delta\phi$ has the following range of values with respect to a cycle $\Phi$ of the absolute phase: $-\Phi/2 < \Delta\phi < \Phi/2$. Thus, the relative origin point position p_0 is obtained by Formula (4) shown below, at STEP S6.

$$p\_0 = p\_r - \Delta\phi \quad (4)$$

Thereafter, the CPU 51 performs conversion between the relative position p and an absolute position P for control which corresponds to an optical position, using a predetermined relational expression. Formula (5) and Formula (6) shown below are examples of such a relational expression. In these formulas, P_0 represents the absolute origin point position.

$$p = p\_0 + (P - P\_0) \quad (5)$$

$$P = P\_0 + (p - p\_0) \quad (6)$$

The microcomputer 5, when moving the lens 222 to the absolute target position corresponding to the desired reset position, outputs the relative target position calculated by Formula (5) to the relative target position circuit 61. Thus, the servo commander 62 drives the driver circuit 63 so that the reference part of the movable portion 22 is returned to the reset position, at STEP S7.

As described above, according to the image pickup apparatus 1, the CPU 51, when detecting a reset edge, determines that the reference part passes through the origin point. Then, the CPU 51 calculates the absolute detection phase $\phi\_r$ using Formula (2). This operation results in a distinct phase difference between the absolute detection phase $\phi\_r$ and the absolute origin point phase $\phi\_0$ as the reference. Thus, a difference between the relative detection phase $\phi\_r$ and the absolute origin point phase $\phi\_0$ which is stored in the ROM 52 is calculated by Formula (3), and then the relative origin point position p_0 is calculated using Formula (4). With this procedure, as long as an error in the absolute detection phase $\phi\_r$ with respect to the absolute origin point phase $\phi\_0$ is within the range of $\pm\frac{1}{2}\Phi$, an origin point returning operation can be carried out precision. Thus, the movable portion 22 is accurately returned to its reset position, regardless of detection position hysteresis of the Schmitt trigger buffer circuit 42 which depends on the passing directions of the movable portion 22, an error due to a change in a shaded state produced by the position detection fin 224 on the photo-interrupter 41, which depends on a play (clearance) between the main shaft 21 and the movable portion 22, and the response characteristics of the photo-interrupter 41.

Moreover, since the movable portion 22 can be returned to reset position regardless of a direction in which the movable portion 22 passes over the photo-interrupter 41, a high speed origin point returning operation can be achieved. Thus, a position of the lens 222 can be returned to the reset position quickly and accurately. Therefore, it is not necessary to install an additional device separately such as a lock mechanism. In addition, conditions on detection precision and the response characteristics of the photo inter 41 are relaxed. This permits simplification of the configuration of the image pickup apparatus 1 and cost reduction.

In the foregoing, an image pickup apparatus and a method for controlling the image pickup apparatus according to an embodiment of the present invention are described, on the basis of the accompanying drawings. However, the present embodiment is not limited to this particular embodiment, and the structure of each component may be replaced with any corresponding structure that has similar functions. In addition, any other element and processing step can be added to the above embodiment of the present invention. For example, in the above embodiment, it is configured such that conversion between an absolute position and a relative position obtained in position detection systems are performed in a microcomputer. However, the present invention is not limited to this configuration, and a circuit having such a coordinate conversion function or preset function may be incorporated in the position detection systems.

Further, in the above embodiment, an MR element 31 is used as a position detection element. However, any other element such as an optical element may be used as the position detection element. In addition, output of the position detection element is not limited to two-phase output, and it maybe three-phase output.

Furthermore, in the above embodiment, the case is described where a DC linear motor, i.e., a translation actuator is applied in the detection system. However, the present invention is not limited to the case, and a rotation actuator may be applied in the detection system.

An image pickup apparatus according to the present embodiment is applicable to a still image pickup apparatus, a video image pickup apparatus, or the like, such as a digital still camera or digital video camera.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus configured to return a movable portion to a reset position, the apparatus comprising:
   relative phase detecting means for detecting an amount of change in a relative phase associated with movement of the movable portion;
   origin point position detecting means for detecting that the position of a reference part corresponding to an origin point of the movable portion passes through the origin point;
   relative position deriving means for deriving information on a relative position of the movable portion based on a counter value and phase resolution position information;
   relative detection position retaining means for retaining a relative detection position of the movable portion based on the information on the relative position obtained at the time of the detection by the origin point position detecting means;
   calculating means for calculating an absolute detection phase based on the relative detection position of the movable portion and for generating a drive signal based on the absolute detection phase; and
   driving means for moving the movable portion to the reset position based on the drive signal,
   the relative phase detecting means operable to output a plurality of signals which are out of phase, in which a difference in phase depends on a position of the movable portion; and
   said relative position deriving means including (i) means for creating phase regions by dividing a unit cycle by a predetermined number in accordance with a relationship between phases of the signals and for creating phase information based on a state of each phase in an individual phase region, (ii) means for performing a counting operation based on an increase or decrease in the phase information so as to obtain the counter value, and (iii) means for receiving the phase information and the signals and for generating the phase resolution position information therefrom.

2. The image pickup apparatus of claim 1, wherein:
   the calculating means comprises absolute phase calculating means for calculating a phase difference between the absolute detection phase and an absolute origin point phase which corresponds to the origin point, absolute position deriving means for deriving information on an absolute position of the movable portion in accordance with the origin point as a reference based on the amount of change in the relative phase, and relative target position deriving means for deriving information on a relative target position of the movable portion corresponding to an absolute target position of the movable portion; and
   the driving means for moving the movable portion to the reset position based on the relative target position.

3. The image pickup apparatus of claim 2, further comprising relative detection position storing means for storing the relative detection position, and absolute origin point phase storing means for storing the absolute origin point phase.

4. The image pickup apparatus of claim 2,
   wherein the absolute position deriving means uses the phase difference as an amount of correction for an error in the absolute detection phase so as to perform correction on a relative origin point position in accordance with, as a reference, the absolute origin point phase in the vicinity of the absolute detection phase.

5. The image pickup apparatus of claim 1, wherein:
   the movable portion includes a scale on which magnetically readable position information is recorded; and
   the relative phase detecting means includes a magnetic sensor for detecting a magnetic field generated from the scale and performing electromagnetic conversion.

6. The image pickup apparatus of claim 1,
   wherein the movable portion includes a linear motor for linearly moving in a predetermined direction.

7. A method for controlling an image pickup apparatus configured to return a movable portion to a reset position, the method comprising:
   deriving information on a relative position of the movable portion based on a counter value and phase resolution position information, when the position of a reference part corresponding to an origin point of the movable portion is detected to pass through the origin point;
   retaining a relative detection position of the movable portion based on the information on the relative position obtained at the time the position of the reference point is detected to pass through the origin point;
   calculating an absolute detection phase based on the relative detection position of the movable portion;
   generating a drive signal based on the absolute detection phase; and
   moving the movable portion to the reset position based on the drive signal,
   said deriving information on the relative position includes (i) creating phase regions by dividing a unit cycle by a predetermined number in accordance with a relationship between phases of signals associated with movement of the movable portion and creating phase information based on a state of each phase in an individual phase region, (ii) performing a counting operation based on an increase or decrease in the phase information so as to obtain the counter value, and (iii) generating the phase resolution position information from the phase information and the signals.

8. An image pickup apparatus configured to return a movable portion to a reset position, the apparatus comprising:
   a relative phase detecting unit operable to detect an amount of change in a relative phase associated with movement of the movable portion;
   an origin point position detecting unit operable to detect that the position of a reference part corresponding to an origin point of the movable portion passes through the origin point;
   a relative position deriving unit operable to derive information on a relative position of the movable portion based on a counter value and phase resolution position information;
   a relative detection position retaining unit operable to retain a relative detection position of the movable portion based on the information on the relative position obtained at the time of the detection by the origin point position detecting unit;
   a calculating unit operable to calculate an absolute detection phase based on the relative detection position of the movable portion and to generate a drive signal based on the absolute detection phase; and
   a driving unit operable to move the movable portion to the reset position based on the drive signal, the relative phase detecting unit operable to output a plurality of signals which are out of phase, in which a difference in phase depends on a position of the movable portion; and said relative position deriving unit including (i) a circuit to create phase regions by dividing a unit cycle by a predetermined number in accordance with a relationship between phases of the signals and to create phase information based on a state of each phase in an individual phase region, (ii) a circuit to perform a counting operation based on an increase or decrease in the phase information so as to obtain the counter value, and (iii) a circuit to receive the phase information and the signals and to generate the phase resolution position information therefrom.

* * * * *